United States Patent

König et al.

[11] Patent Number: 5,820,508
[45] Date of Patent: Oct. 13, 1998

[54] TRANSMISSION, IN PARTICULAR FOR AGRICULTURAL VEHICLES AND MACHINES

[75] Inventors: Ralf König; Heinz König, both of Harsewinkel, Germany

[73] Assignee: Class KGaA, Germany

[21] Appl. No.: 662,202

[22] Filed: Jun. 12, 1996

[30] Foreign Application Priority Data

Jun. 13, 1995 [DE] Germany .......................... 195 21 486.2

[51] Int. Cl.⁶ .................................................. F16H 37/08
[52] U.S. Cl. ......................... 475/210; 475/208; 475/211
[58] Field of Search ................................. 475/210, 211, 475/207, 208

[56] References Cited

U.S. PATENT DOCUMENTS

| | | | |
|---|---|---|---|
| 2,852,130 | 9/1958 | Wallace | 475/208 X |
| 3,152,490 | 10/1964 | Lemieux | 475/211 X |
| 3,340,749 | 9/1967 | Magg et al. | 475/211 |
| 3,939,732 | 2/1976 | Giacosa | 475/210 |
| 4,056,987 | 11/1977 | Hoffmann | 475/210 X |
| 4,136,581 | 1/1979 | Winter et al. | 475/210 |
| 4,402,237 | 9/1983 | Tomlinson | 475/211 X |
| 4,409,862 | 10/1983 | Adkins | 475/211 |
| 4,553,450 | 11/1985 | Gizard . | |
| 4,599,916 | 7/1986 | Hirosawa . | |
| 4,644,821 | 2/1987 | Sumiyoshi et al. . | |
| 5,055,094 | 10/1991 | Cataldo | 475/207 X |
| 5,292,290 | 3/1994 | Scholz et al. | 475/210 X |

FOREIGN PATENT DOCUMENTS

| | | |
|---|---|---|
| 0 003 408 B1 | 8/1979 | European Pat. Off. . |
| 0 071 801 A1 | 2/1983 | European Pat. Off. . |
| 0 173 482 A1 | 3/1986 | European Pat. Off. . |
| 0 232 979 B1 | 8/1987 | European Pat. Off. . |
| 1 625 030 | 2/1970 | Germany . |
| 29 48 681 A1 | 6/1981 | Germany . |
| 31 24 070 A1 | 1/1983 | Germany . |
| 35 38 343 A1 | 5/1986 | Germany . |
| 35 43 635 A1 | 6/1986 | Germany . |
| 39 26 794 A1 | 2/1991 | Germany . |
| 41 07 739 A1 | 9/1991 | Germany . |
| 94/21941 | 9/1994 | WIPO . |

OTHER PUBLICATIONS

Dubbel, Taschenbuch für den Maschinenbau, Springer–Verlag, Berlin, 17.Aufl., S. G 147, S. G 148.
Morhard, Joachim, Stufenlose verstellbare Umschlingungsgetriebe. In: antriebstechnik 10, 1971, Nr.5, S.165–171.
JP Patent Abstracts of Japan –56–49458 A.,M–77, Jul. 8, 1981, vol. 5, No. 105.
JP Patent Abstracts of Japan –56–49454 A.,M –77, Jul. 8, 1981, vol. 5, No. 105.
JP Patent Abstracts of Japan –56–49452 A.,M –77, Jul. 8, 1981, vol. 5, No. 105.

*Primary Examiner*—Khoi Q. Ta
*Assistant Examiner*—Peter T. Kwon
*Attorney, Agent, or Firm*—Cummings & Lockwood

[57] ABSTRACT

A transmission comprises an input shaft and a variator having an infinitely variable transmission ratio. The variator has a variator input being driven by the input shaft and has a variator output. A planetary gear train is configured as a summing gear train with a first input, a second input and an output. The first input is adapted to be drivingly connected to the input shaft and the second input is driven by the variator output. An output shaft is driven by the planetary gear train output. A first clutch is provided for drivingly connecting the first planetary gear train input to the input shaft, whereas a second clutch is provided for drivingly connecting the variator output to the output shaft.

37 Claims, 5 Drawing Sheets

TRANSMISSION, IN PARTICULAR FOR AGRICULTURAL VEHICLES AND MACHINES

FIELD OF THE INVENTION

The invention, generally, relates to the field of transmissions. More specifically, the invention relates to transmissions of the split-power coupled planetary gear train type. Still more specifically, the invention is related to the field of agricultural vehicles and machines.

BACKGROUND OF THE INVENTION

The invention is related to a transmission, in particular a transmission of the split-power coupled planetary gear train type comprising an input shaft and a variator having an infinitely variable transmission ratio, the variator being driven at its input by the input shaft. Further, a planetary summing gear is provided having two inputs. A first input is driven by the input shaft whereas a second input is driven from the output of the variator. The output of the summing gear drives the output shaft of the transmission.

A split-power coupled planetary gear box of the above-mentioned kind is disclosed in German textbook DUBBEL, Taschenbuch fur den Maschinenbau, 18. Edition, Springer-Verlag, 1995, pp. G 146 through 148.

In the prior art various transmission concepts have been disclosed where a given input rotational speed shall be transmitted into a desired output rotational speed. When doing so, not only a transmission in rotational speed but also a transmission in torque takes place. This phenomenon is also referred to as "torque conversion".

In one-gear transmissions the rotational speed may only be transmitted according to a fixed transmission ratio. When using plural-speed transmissions, a certain rotational speed range may be covered. However, when switching from one gear to another gear, an interruption of torque occurs with most prior art plural-gear transmissions because the flow of torque within the transmission has to be interrupted for a short period of time for bringing torque-transmitting transmission elements, in particular toothed wheels, in engagement with each other or releasing same from each other, respectively.

In order to avoid such torque interruptions during gear change in such transmissions, one has developed appropriate transmissions for certain applications, for example for agricultural vehicles. However, these transmissions have the disadvantage of reduced efficiency and, concurrently, of increased complexity in design. During gear change the differences in rotational speed between the respective gears have to be bridged by complicated frictional couplings. In other cases where one has attempted to obtain infinitely variable transmission ratios, one has even taken into account still more significant reductions in efficiency of hydrostatic drives in order for obtaining the desired variation in transmission ratio.

Another possibility for designing transmissions having infinitely variable transmission ratios consists in the use of so-called variators having displaceable pulleys. However, such pulley transmissions may only be used in quite limited fields of applications due to their inherent disadvantages.

Moreover, all these transmission concepts (excluding hydrostats) have the common disadvantage that an additional reversing gear is necessary if it is intended to reverse the output rotational speed, for example for establishing a reverse gear in a vehicle.

In order to enhance the efficiency of such transmissions showing no interruption of torque during gear shift or having an infinitely variable transmission ratio, the prior art has developed certain split-power coupled gear boxes of the hydrostatic—mechanic type. An example of such a transmission is disclosed in German Offenlegungsschrift 31 47 447. However, also this transmission has the disadvantage that it is highly complicated in production due to its hydrostatic components.

Further to the afore-described transmission types another type of transmission has been known under the name split-power coupled planetary gear boxes. Such gear boxes have essentially been designed for stationary applications.

Such split-power coupled planetary gear boxes are transmissions in which the input power is split and the respective two fractions of input power are fed to a summing gear stage, the output of which concurrently constituting the transmission output. A transmission stage having an infinitely variable transmission ratio is switched into one of the two power paths at one input of the summing gear stage.

If the summing gear stage is a planetary gear train, the input power in the first path may be directly fed to the arm of the planetary gear train whereas the other path comprising the infinitely variable transmission stage is coupled to the ring gear of the planetary gear train. The output of the transmission is configured by the sun gear or the sun gear shaft of the planetary gear train in such cases.

By appropriately setting the transmission of the infinitely variable gear stage the entire transmission ratio of the transmission may also be set infinitely. This may be done within wide ranges and, as the case may be, across the point of zero rotational speed. When doing so, positive as well as negative rotational speeds may be set at the output of the transmission.

However, split-power coupled planetary transmissions of the afore-mentioned kind have the disadvantage that the power must always be split between two paths such that respective idle powers are generated. Moreover, it is a disadvantage for many fields of application that the transmission, when being under load, has to be started from rotational speed zero of the infinitely variable transmission stage. If the infinitely variable transmission stage is a belt drive with displaceable pulleys, substantial problems might arise because the belt transmission may be at an end position upon starting such that the belts might be bent transverse to their running direction due to the high belt forces being exerted in such a situation. Moreover, the efficiency of the transmission is quite poor in such driving conditions.

Such applications, however, quite frequently occur in the field of vehicles, i.e. in a field of application where such split-power coupled transmissions have been used only at very few instances before. The above-explained problems, in particular, arise with agricultural vehicles where the transmissions are also used for driving agricultural units or attachments. A typical field of application is a harvester-thresher, the threshing drum of which being driven via a transmission. If the threshing drum shall be started from standstill, the afore explained disadvantages may occur when using a conventional split-power coupled transmission. For these reasons split-power coupled transmissions have not been used for such applications before.

It is, therefore, an object underlying the invention to improve a split-power coupled transmission of the kind mentioned at the outset such that a low-loss operation becomes possible under operational conditions mostly occurring in practice while maintaining the advantages of a large transmission ratio range as well as the possibility of inverting the direction of rotation. When doing so, an infinitely variable variation of output rotational speed shall become possible under load. Further, when starting an attachment driven by the transmission, none of the aforementioned problems shall arise. Finally, the transmission shall have a high efficiency and shall be of a type which may be produced at low costs.

SUMMARY OF THE INVENTION

These and other objects are achieved by a transmission comprising:

an input shaft;

a variator having an infinitely variable transmission ratio, the variator having a variator input being driven by the input shaft and having a variator output;

a planetary gear train being configured as a summing gear train with a first input, a second input and an output, the first input being adapted to be drivingly connected to the input shaft, and the second input being driven by the variator output;

an output shaft driven by the planetary gear train output;

a first clutch for drivingly connecting the first planetary gear train input to the input shaft; and a second clutch for drivingly connecting the variator output to the output shaft.

Moreover, the object is achieved by an agricultural vehicle or an agricultural machine having transmissions of the type as hereinbefore stated.

The object underlying the invention is such entirely achieved.

By alternately actuating the clutches, the drive power is, on the one hand side, directed to the output only via the variator whereas, on the other hand side, a conventional split-power operation is possible. The output of the planetary gear train, therefore, drives the output shaft in a split-power mode of operation with the first clutch being closed and the second clutch being opened, whereas in a non-split-power mode of operation the first clutch is opened and the second clutch is closed.

When doing so a large number of potential applications of the transmission may be covered by only operating the variator so that the idle powers that would otherwise occur in the summing gear train do not occur.

According to a first preferred embodiment of the transmission according to the invention, the planetary gear train is an epicyclic gear and comprises two gearwheel pairs having each a first and a second gearwheel meshing with each other, the first gearwheels being rigidly mounted on a common arm shaft whereas one of the second gearwheels is connected to the first planetary gear train input for common rotation therewith and the other of the second gearwheels is connected to the planetary gear train output for common rotation therewith, the arm shaft being rotatably journalled in an arm housing, the arm housing being connected t o a hollow shaft constituting the second planetary gear train input.

According to an alternate embodiment of the invention, however, the planetary gear train is a planetary ring gear train and has an arm constituting the first planetary gear train input, has a ring gear constituting the second planetary gear train input, and has a a sun gear constituting the planetary gear train output.

According to the invention, therefore, a planetary summing gear is used with which the input power is split into two separate power paths. Whereas the first power path may be guided, for example, via a variator being rigidly arranged on the input shaft and transmitting force by a broad V-belt to the transmission, the second power fraction is directed to the transmission via a constant drive having a fixed transmission ratio. Preferably, the variator is a belt drive having displaceable pulleys. Still more preferably, the belt drive is directly driven by the input shaft. If the constant drive is configured as a belt drive having fixed pulleys, a displaceable pulley as well as a fixed pulley may each be rigidly arranged on the input shaft.

According to preferred embodiments of the invention, the clutches are adapted to be actuated, preferably actuated alternately. More specifically, the clutches are adapted to be actuated alternately upon an occurrence of transition between two output rotational speed ranges or, as the case may be, upon starting.

According to another preferred embodiment of the invention, the first output rotational speed range is a split-power range with only the first clutch being closed for splitting input power on the input shaft into a first fraction being torque converted in the variator, and a second fraction being torque converted in the planetary gear train, the second output rotational speed range being a non-split-power range with only the second clutch being closed for torque-converting the input power on the input shaft only in the variator.

According to a modification of this embodiment, the planetary gear train is an epicyclic gear and is adapted to be bridged in the second output rotational speed range. In a still more specific modification of the embodiment the planetary gear train is a planetary ring gear train rotating as a rigid block in the second output rotational speed range.

According to the two clutches that may be actuated independently one from the other, the output rotational speeds may be separated into two ranges, i.e. a split-power and a non-split-power range.

For achieving the highest possible efficiency without idle power the main operational range of the attachment being driven by the transmission shall lie in the non-split-power range corresponding to the variator control range. The two ranges adjoin one each other.

When the number of teeth of the toothed wheels in the summing gear stage are selected accordingly, it is—starting from a gear shift rotational speed at which the input shaft rotational speed is identical to the output shaft rotational speed—possible to control the output rational speed to be zero at an increasing rotational speed to be transmitted by the variator, and, further, when the variator rotational speed is still increasing, to control the output rotational speed into the negative range by inverting the direction of rotation.

The two ranges are interleaved by means of two clutches where both clutches may be switched under load when the rotational speeds in the first and in the second range, respectively, are equal. The second clutch is configured to couple the variable power path via the variator whereas the first clutch couples the constant power path. By alternately actuating the clutches one may achieve that the drive power, when the second clutch, coupling the variator is actuated, is only transmitted conventionally via the variator to the output, whereas when the first clutch is actuated, a split-power operation becomes possible.

At the gear shift point, when the rotational speeds in the first and in the second range are equal, both couplings may be actuated simultaneously for a short period of time. By deactuating the one or the other clutch it is possible to switch between the two ranges under load without interrupting the flow of torque. Another essential advantage resides in the fact that both clutches may be configured as form-fitting clutches, i.e. clutches that may be of small and relatively simple design.

According to a further embodiment of the invention, the transmission ratios in the variator and in the planetary gear train are selected such that output rotational speed of the output shaft is zero when the variator is at a center of its displacement range within the first output rotational speed range.

Hence, when starting, both clutches are open and the variator is automatically controlled such that the transmission output rotational speed is zero. Subsequently, the first clutch is closed for effecting constant drive and output rotational speed is then controlled to be set on a value not equalling zero.

This measure has the advantage that for starting an implement driven by the transmission, one must not begin with a variator rotational speed of zero but may begin with a speed not equalling zero such that the variator with its running belt is put under load within the range of its highest power density.

Further, it is preferred for starting a unit or an attachment driven by the transmission to set the output rotational speed first to be zero by means of the variator, the output rotational speed being subsequently increased to a value not equalling zero with the first clutch being closed.

Provided that the output rotational speed is not set to be zero anyway, and, further, that at least one of the two clutches is still closed, according to a modification of this embodiment both clutches are initially opened at a drive rotational speed not equalling zero and the output rotational speed is then set to be zero by means of the variator.

According to another embodiment of the invention, the transmission is operated at constant input rotational speed at the input shaft.

Further, it is preferred that the output rotational speed of the output shaft may be infinitely adjusted from positive speeds over zero speed to negative speeds depending from a preselected transition ratio of the transmission.

Moreover, according to the invention for switching between the output rotational speed ranges the first and the second clutch may be set at their respective inputs and outputs to rotate at same speed for allowing the switching to occur without interruption of transmitted torque.

A transmission designed according to the present invention may be used as a primary transmission in vehicle propulsion systems as well as they may be used as infinitely variable transmissions for driving machine components, for example threshing drums in a harvester-thresher. Vehicles being equipped with a transmission according to the invention allow to adjust the transmission ratio infinitely at constant and, hence, optimum engine rotational speed and, further, allow to displace under load in a forward and a reverse direction, without the necessity of actuating clutches or preselecting gears. If the main operational range is designed to be in the non-power-split range, idle powers may be avoided which would otherwise occur in conventional summing gear stages. Hence, the vehicle or the machine may be operated economically. If a conventional variator drive of a threshing drum is replaced by a transmission according to the invention, it is not only possible to dispose of a reduction gear stage with associated gear shift actions as has been absolutely necessary conventionally; instead it is possible to install an additional reversing function which was not possible with conventional drive concepts.

One has to bear in mind however, that when the invention is put into practice by means of an epicyclic gear train, the variator must be coupled to the arm and the constant power path must be coupled to the big sun gear, whereas in a planetary ring gear train the variator must be coupled to the ring gear and the constant power path must be coupled to the arm, if inadmissible rotational speeds within the summing gear stage shall be avoided or the function shall be realized, anyway.

If the transmission according to the invention is designed as an epicyclic gear train, two pairs of toothed wheels are required having each two intermeshing toothed wheels. One of these each is arranged to rotate with the arm shaft whereas the respective other toothed wheel is arranged to rotate with the input shaft being the first input path or with the output shaft being the output, respectively. Further, the arm shaft is journalled to rotate in an arm housing. The arm housing is arranged to rotate with a hollow shaft being the second input path. Further, it would be possible to use a planetary double wheel being journalled to rotate on the arm shaft which, in turn, would be arranged to not rotate. If, however, the transmission according to the invention is designed as a planetary ring gear train, the variator has to be coupled to the ring gear. The clutches for the variator and the constant drive, if actuated, act on the arm shaft being guided by the ring gear, the arm shaft being connected to the planetary gear whereas the output shaft is connected to the sun gear of the planetary ring gear train.

With the planetary gear concepts of the afore-mentioned kind a small variator control range becomes possible. The term "small variator control range" is to be understood in a practical embodiment of the invention to be, for example, $i_{var}=2.3$. However, deviations from the given value upwardly or downwardly are well possible. If the variator range is set, as suggested, to be $i_{var}=2.3$, one has the advantage that at least 50% of the maximum forward rotational speed may be used for reverse operation. It is easier to realize the necessary transmission ratio when using an epicyclic planetary gear train because, as compared to a planetary ring gear train one has more degrees of freedom with respect to the selection of the transmission ratio. Therefore, the basic object to achieve a smaller variator control range may be easier realized in an epicyclic planetary gear train because it has a higher power density. The term "higher power density" is to be understood for a variator having a greater minimum diameter due to a smaller control range and, if the outer diameter is fixed, has a smaller upper belt width at a greater belt height and has conventional output rotational speeds such that if the belt is put under high load it will not be bent transversely to its running direction. In an epicyclic gear train one has the further advantage that the rotational speeds of the planetary gears may be lower as compared to most planetary gears having a ring gear.

When using the described arrangement, one obtains an extremely compact transmission of simple design and high power density that fulfills the requirements according to the object underlying the invention.

According to a further embodiment of the invention, it is possible to attach a reverse gear stage to the epicyclic planetary gear train or the planetary ring gear train, respectively, to transmit input power without idle powers in the non-power-split range in a reverse direction without inverting the direction of rotation. The inversion of the direction of rotation will be effected by the reverse gear stage in this embodiment of the invention. If the output rotational speed of the planetary summing gear stage becomes zero, the reverse clutch may be opened and the reverse gear stage may be actuated. The variator rotation speed will not be increased when the output rotational speed of the planetary summing gear stage becomes zero. After the reverse gear stage has been actuated, it will, in contrast, be reduced because otherwise an unintended inversion of rotational speed would occur at the output shaft of the planetary summing gear stage. If the variator rotational speed is so much reduced for increasing the negative output rotational speed at inverted direction of rotation, that it coincides with the rotational speed of the constant drive, one may switch over from the split-power range to the non-split-power range in which no idle powers occur, by actuating the clutches within the planetary summing gear stage as described above.

Depending on the shifted position of the reverse gear stage, one may utilize the entire rotational speed range of the output shaft in a forward as well as in a reverse direction when using the proposed arrangement. The lower output shaft rotational speeds below the minimum variator rotational speed down to rotational output speed zero are split-powered when the constant drive clutch is closed whereas the higher rotational speeds may be infinitely controlled non-split-powered when the variator clutch is closed.

In case that the available space for the transmission is extremely limited, one can, in another preferred embodiment of the invention, arrange the constant drive at the input and/or arrange the variator at another location of the machine or of the vehicle, as compared to the planetary summing gear stage. The powers transmitted by the constant drive and/or the variator may then be guided to the respective transmission output by means of conventional power transmission elements in one or in several stages.

BRIEF DESCRIPTION OF THE DRAWINGS

Further advantages will become apparent from the description and the enclosed drawing.

It goes without saying that the features explained before and to be explained hereinafter may not only be used in the specifically given combination but may also be used in other combinations or alone without leaving the scope of the present invention.

Embodiments of the invention are shown in the drawing and will be described in further detail in the subsequent description. In the Figures.

DESCRIPTION OF THE PREFERRED EMBODIMENT

Figure 1:
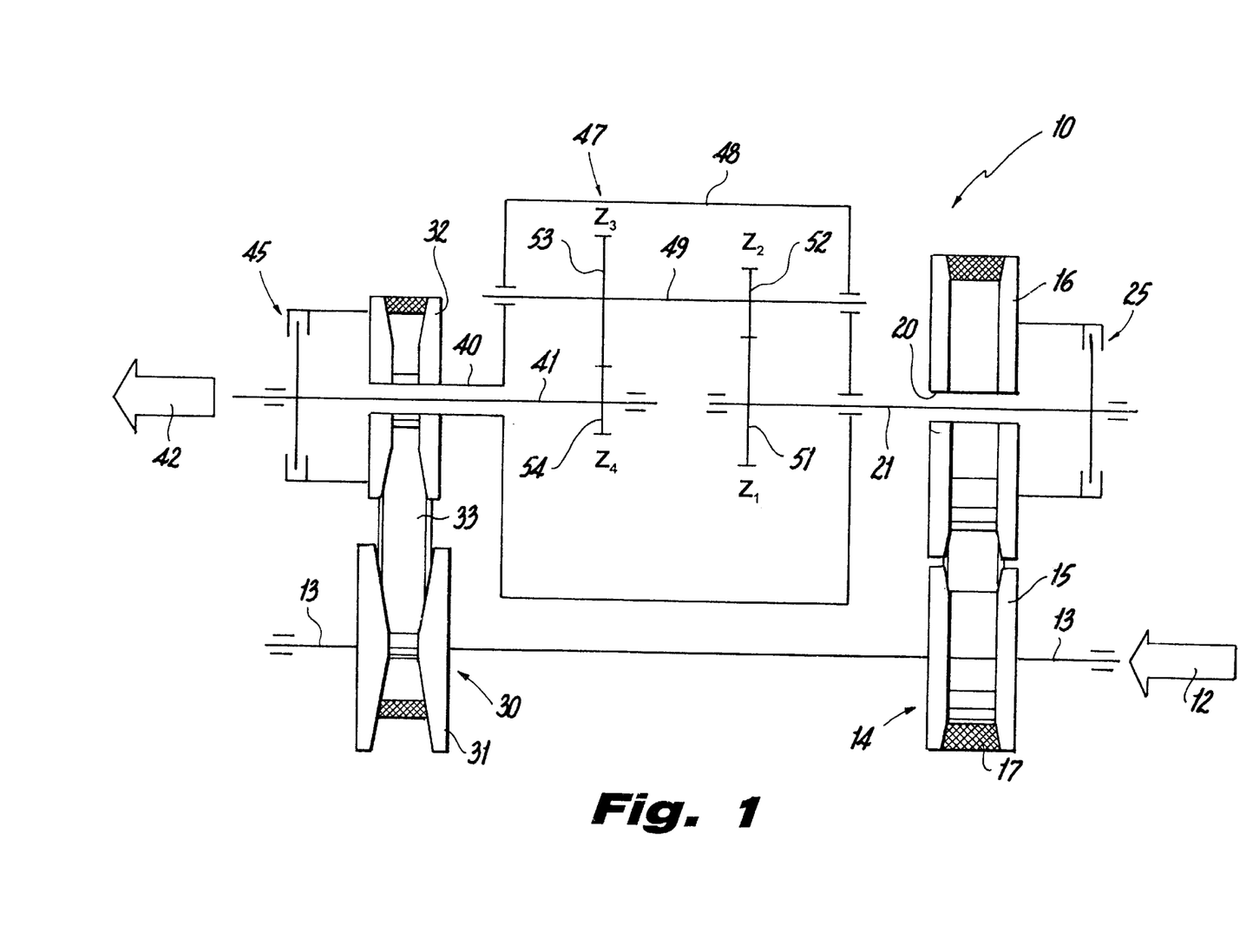
FIG. 1 is a schematic representation of an embodiment of a split-power coupled planetary gear box configured as an epicyclic planetary gear train.

In FIG. 1 reference numeral 10 as a whole indicates a transmission of the split-power coupled planetary gear box type. A transmission input 12 as symbolized by an arrow is configured by an input shaft 13. A belt drive 14 having a constant transmission ratio comprises a first pulley 15, a second pulley 16 as well as a belt 17 wrapped around pulleys 15, 16. First pulley 15 is rigidly connected to input shaft 13 for rotation therewith.

As indicated at 20, second pulley 16 is loosely journalled on an intermediate shaft 21. Intermediate shaft 21 extends parallel to input shaft 13. By means of a first clutch 25 second pulley 16 may be brought into rotational driving connection with intermediate shaft 21.

A variator 30 having an infinitely variable transmission ratio is also incorporated in split-power coupled planetary gear box 10 of FIG. 1 and is configured as a belt drive. Variator 30 has a first pulley 31, a second pulley 32 as well as a belt 33 being wrapped around pulleys 31, 32. First pulley 31 is also rigidly arranged on input shaft 13 to rotate therewith.

In contrast, second pulley 32 of variator 30 is seated on a hollow shaft 40 surrounding an output shaft 41. Hollow shaft 40 and output shaft 41 also extend parallel to input shaft 13. Further, they are arranged coaxially to intermediate shaft 21.

By means of a second clutch 45 second pulley 32 of variator 30 together with hollow shaft 40 may be rigidly connected to output shaft 41 for rotation therewith.

For the ease of simplicity the components for actuating and controlling clutches 25, 45 as well as variator 30 are not depicted in FIG. 1. These elements are known per se and, hence, need not be described in further detail within this description.

An epicyclic planetary gear train being indicated as a hole with reference numeral 47 is arranged between intermediate shaft 21 on the one hand side and output shaft 41 together with hollow shaft 40 on the other hand side. Epicyclic planetary gear train 47 has an arm housing 48. Arm housing 48 on its left hand side in FIG. 1 is rigidly connected to hollow shaft 40 for rotation therewith. On its right hand side in FIG. 1 arm housing 48 is journalled on intermediate shaft 21.

At a radial distance from intermediate shaft 21 and from output shaft 41 an arm shaft 49 is rotatably journalled within arm housing 48 or a planetary double wheel 52/53 is rotatably journalled on fixed arm shaft 49, respectively.

Within arm housing 48 intermediate shaft 21 rigidly supports a first gearwheel 51 meshing with a second gearwheel 52 being rigidly seated on arm shaft 49. A third gearwheel 53 being also rigidly seated on arm shaft 49 meshes with a fourth gearwheel 54 being rigidly arranged on output shaft 41. In such a way two gearwheel sets are created, namely one set configured by first and second gearwheel 51/52 and another set configured by third and fourth gearwheel 53/54. The respective numbers of teeth on the four gearwheels 51 through 54 are identified by $Z_1$, through $Z_4$ in FIG. 1.

Figure 2:
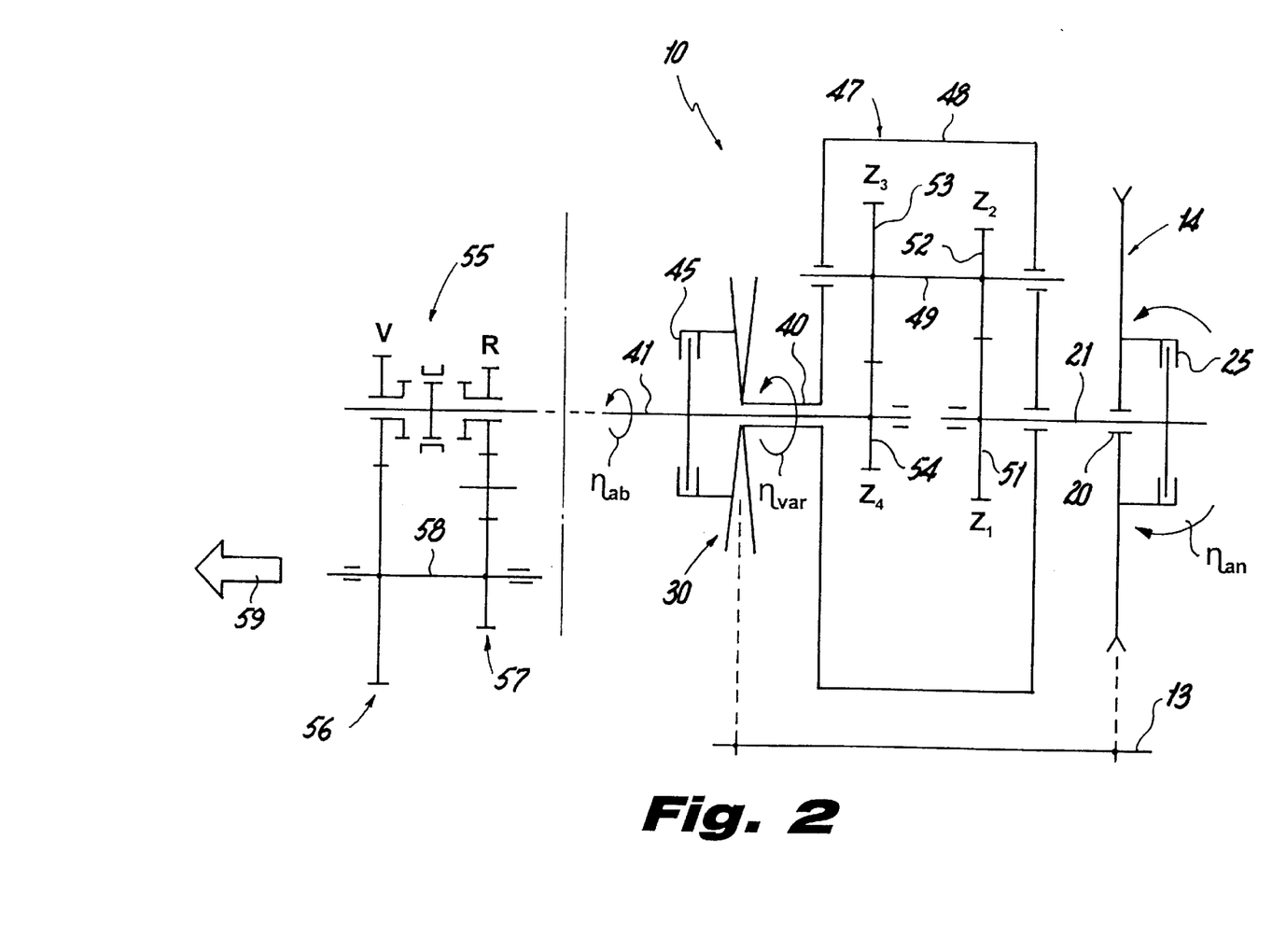
FIG. 2 the transmission of FIG. 1, however, in a still more schematic representation.

Split-power coupled planetary gear train 10 of FIG. 1 is also shown in FIG. 2, however, still more schematically. In FIG. 2 the rotational speed of second pulley 16 of belt drive 14 is identified as input rotational speed $n_{an}$, the rotational speed of hollow shaft 40 is identified as variator rotational speed $n_{var}$ and the rotational speed of output shaft 41 is identified as output rotational speed $n_{ab}$.

FIG. 2, moreover, indicates that a reverse gear stage 55 may be coupled to the output of gear box 10. This option is indicated by a dotted line extending further than the output shaft as well as by a vertical dash-dotted line.

The design, function and effects of reverse gear 55 will be explained further below in connection with FIG. 4.

Figure 3:
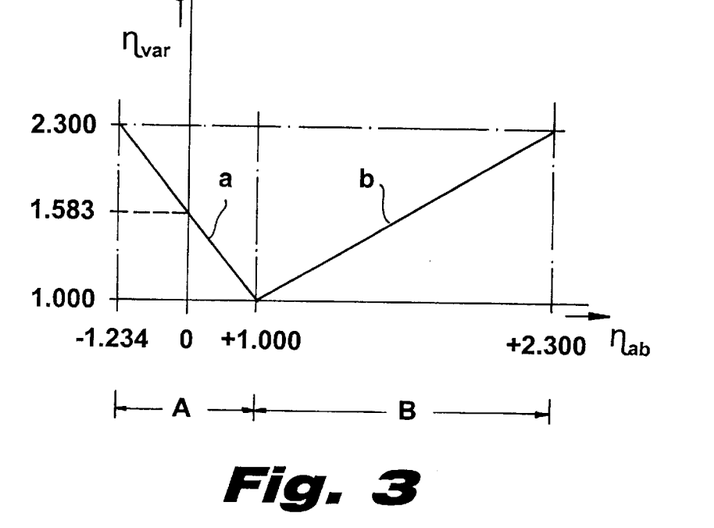
FIG. 3 a rotational speed diagram for explaining the transmission of FIG. 2 without, however, taking into account a subsequent reverse gear stage.

FIG. 3 shows a diagram in which variator rotational speed $n_{var}$ is indicated on the x-axis and the output rotational speed $n_{ab}$ is indicated along the y-axis. Both axes show figures of rotational speeds being taken from a practical embodiment of the invention. These figures are, hence, to be understood only as examples but shall not in any way limit the scope of the present invention.

In the depicted embodiment the rotational speed diagram, as related to output rotational speed $n_{ab}$ is subdivided into a split-power range A and a non-split-power range B, to which belong rotational speed diagrams a and b, respectively. Within range A first clutch 25 is closed and second clutch 45 is opened. Within range B, however, first clutch 25 is opened and second clutch 45 is closed. When doing so, input power is transmitted as follows:

Within range A the input power is split. A first fraction of the input power flows from input shaft 13 via belt drive 14 and closed first clutch 25 on intermediate shaft 21 and from there via transmission ratio $Z_1/Z_2$ of gearwheels 51, 52 to arm shaft 49. Intermediate shaft 21, hence, serves as a first input of epicyclic planetary gear train 47 being configured as a summing gear stage.

The second power fraction flows over input shaft 13 and variator 30 on hollow shaft 40. Hollow shaft 40 drives arm housing 48 and, hence, arm shaft 49. Hollow shaft 40 is, hence, the second input of epicyclic planetary gear train 47 being configured as a summing gear stage.

The sum of these two power fractions is then directed via transmission ratio $Z_3/Z_4$ of gearwheels 53, 54 on output shaft 41 being the output of epicyclic planetary gear train 47.

In contrast, within range B the input power is not split. The input power, instead, entirely flows over input shaft 13 and variator 30 and from there directly via closed second clutch 45 on output shaft 41, hence, within range B the transmission is operated in a pure variator regime.

As may be taken from the diagram of FIG. 3, the shown function occurs when the transmission ratio of the variator is sweeped at constant input rotational speed $n_{an}$. For example, within range A output rotational speed during sweeping the transmission ratio range of the variator 30 is altered from $-1,234$ via zero to $+1,000$ min$^{-1}$, whereas variator rotational speed $n_{var}$ decreases concurrently from 2,300 to 1,000 min$^{-1}$.

Interesting to note that at a variator rotational speed of, for example, 1,583 min$^{-1}$ output rotational speed $n_{ab}$ is exactly zero. This means that an attachment being coupled to transmission 10 may be started from standstill both into positive or negative rotational speeds, starting from a finite rotational speed of variator 30. In contrast to conventional transmission systems variator 30 need not be started from standstill.

In shifting point or cross-overpoint at, for example, $+1,000$ min$^{-1}$ of output rotational speed $n_{ab}$ second pulley 32 of variator 30 and output shaft 41 have exactly the same rotational speed as well as intermediate shaft 21 and second pulley 16 of belt drive 14. Clutches 25 and 45 may, hence, be switched without load. Hence, it is possible to design clutches 25, 45 as simple form-fit clutches, for example as tooth clutches, cam clutches or claw clutches.

After switching over clutches 25, 45, output rotational speed $n_{ab}$ is increased from e.g. $+1,000$ to $+2,300$ min$^{-1}$ when the transmission ratio range of variator 30 is sweeped as clearly shown by diagram b in FIG. 3.

When designing this embodiment of the invention, a toothing of gearwheels 51 through 54 was assumed for calculating rotational speeds where $Z_1=29$, $Z_2=16$, $Z_3=27$ and $Z_4=18$. The sweeping range of variator 30 was assumed to be $i_{var}=2.3$. Constant drive rotational speed was selected to correspond e.g. a minimum variator output rotational speed $n_{var}$ of 1,000 min$^{-1}$.

As a result, range B may be used as the primary operational range in which epicyclic planetary gear train 47 is out of function. This range B may be compared to conventional applications of variators.

If gear box 10 is used as a propulsion unit for a vehicle, range A is used for lowering drive rotational speed $n_{ab}$ below 1,000 min$^{-1}$ down to 0 min$^{-1}$ for starting at speed zero as well as for ranging at speed zero. Driving in reverse direction is possible up to an output rotational speed $n_{ab}$ of $-1,234$ min$^{-1}$. In that case the variator 30 runs at $n_{var}=2,300$ min$^{-1}$.

If gear box 10 is used for driving a drum, for example a threshing drum in harvester-thresher, range A is used for lowering output rotational speed $n_{ab}$ and for reversing.

The transmission is started as follows:

If the transmission was switched off during a preceding operation such that output rotational speed $n_{ab}$ is not zero, one has to open both clutches 25 and 45 first. By setting the variator to a variator rotational speed $n_{var}=1,583$ min$^{-1}$ at a constant drive of e.g. n=1,000 min$^{-1}$, an output rotational speed of $n_{ab}=0$ is set. First clutch 25 may now be closed. As output rotational speed $n_{ab}=0$, the driven threshing drum is at a standstill. When variator rotational speed $n_{var}$ is altered, the driven implement is started.

If, however, output rotational speed $n_{ab}$ had been set to be zero during a preceding operation and the transmission had been switched off with this setting, it is, of course, not necessary to open clutches 25 and 45 and to set an output rotational speed of $n_{ab}=0$. In that case one may, instead, close first clutch 25 immediately and then start the attachment by varying variator rotational speed $n_{var}$.

It had been mentioned further above that gear box 10 as depicted in FIG. 2 may be provided with a reverse gear stage 55 at its output. For that purpose reverse gear stage 55 is coupled to output shaft 41.

Reverse gear 55 comprises a first gearwheel set 56 with two gearwheels and a second gearwheel set 57 with three gearwheels. Via first gearwheel set 56 the output of gear box 10 may be operated in a forward direction V and may be operated in a reverse direction R via second gearwheel set 57. An output shaft 58 of reverse gear stage 55 is, simultaneously, the transmission output 59, as indicated by an arrow.

Figure 4:
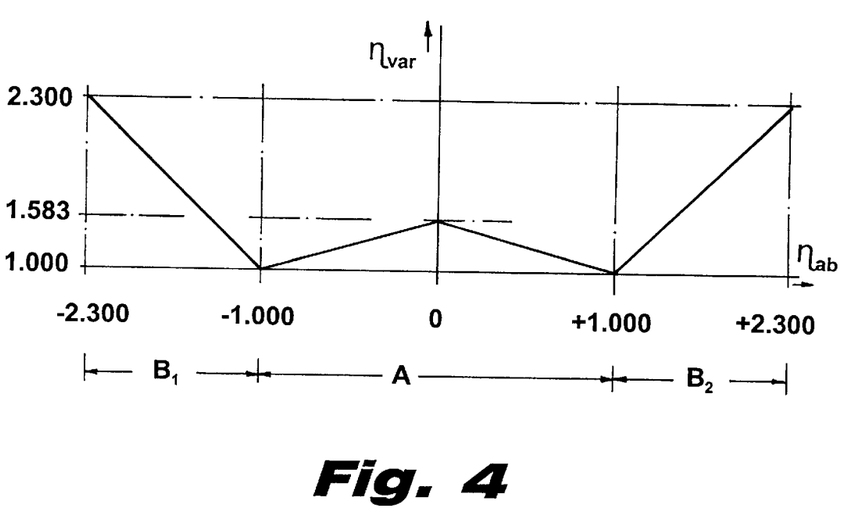
FIG. 4 a rotational speed diagram, similar to that of FIG. 3, however, for explaining the transmission of FIG. 2 together with a subsequent reverse gear stage.

FIG. 4 shows a diagram similar to that of FIG. 3 and belonging to the transmission of FIG. 2 utilizing reverse gear stage 55.

As one can see, there exist two non-power-split ranges $B_1$ and $B_2$ besides split-power range A. In split-power range A first clutch 25 is closed whereas in the non-split-power ranges $B_1$ and $B_2$ second clutch 45 is closed. If reverse gear stage 55 is operated in a forward direction V by selecting first gearwheel set 57, output rotational speed varies within split-power range A from a value zero to a value $+1,000$ min$^{-1}$, whereas the variator rotational speed concurrently decreases from $+1,538$ min$^{-1}$ to 1,000 min$^{-1}$. Within non-split-power range $B_2$ output rotational speed nab increases from $+1,000$ to $+2,300$ min$^{-1}$, whereas variator rotational speed concurrently increases from 1,000 min$^{-1}$ to 2,300 min$^{-1}$.

In reverse operation R the conditions are exactly opposite, as one can clearly see from FIG. 4.

The embodiment shown corresponds to an arrangement with $i_{var}=2.3$ and an input rotational speed $n_{an}$ of 1,000 min$^{-1}$.

One can easily see from the diagram of FIG. 4 that reverse gear stage 55 may be opened when output rotational speed $n_{ab}$ is zero. The variator rotational speed is then +1,583 min$^{-1}$. When reverse gear stage 55 is opened, one may switch from forward V to reverse R or vice versa.

As already mentioned at the outset, variator rotational speed $n_{ar}$ decreases to both sides of the zero point of output rotational speed $n_{ab}$ because otherwise an undesired inversion of rotational speed would occur at output shaft 41 of planetary summing gear stage 47.

FIG. 4, further, shows that the entire rotational speed range from −2,300 to +2,300 min$^{-1}$ of output rotational speed $n_{ab}$ may be sweeped steplessly or infinitely.

Figure 5:
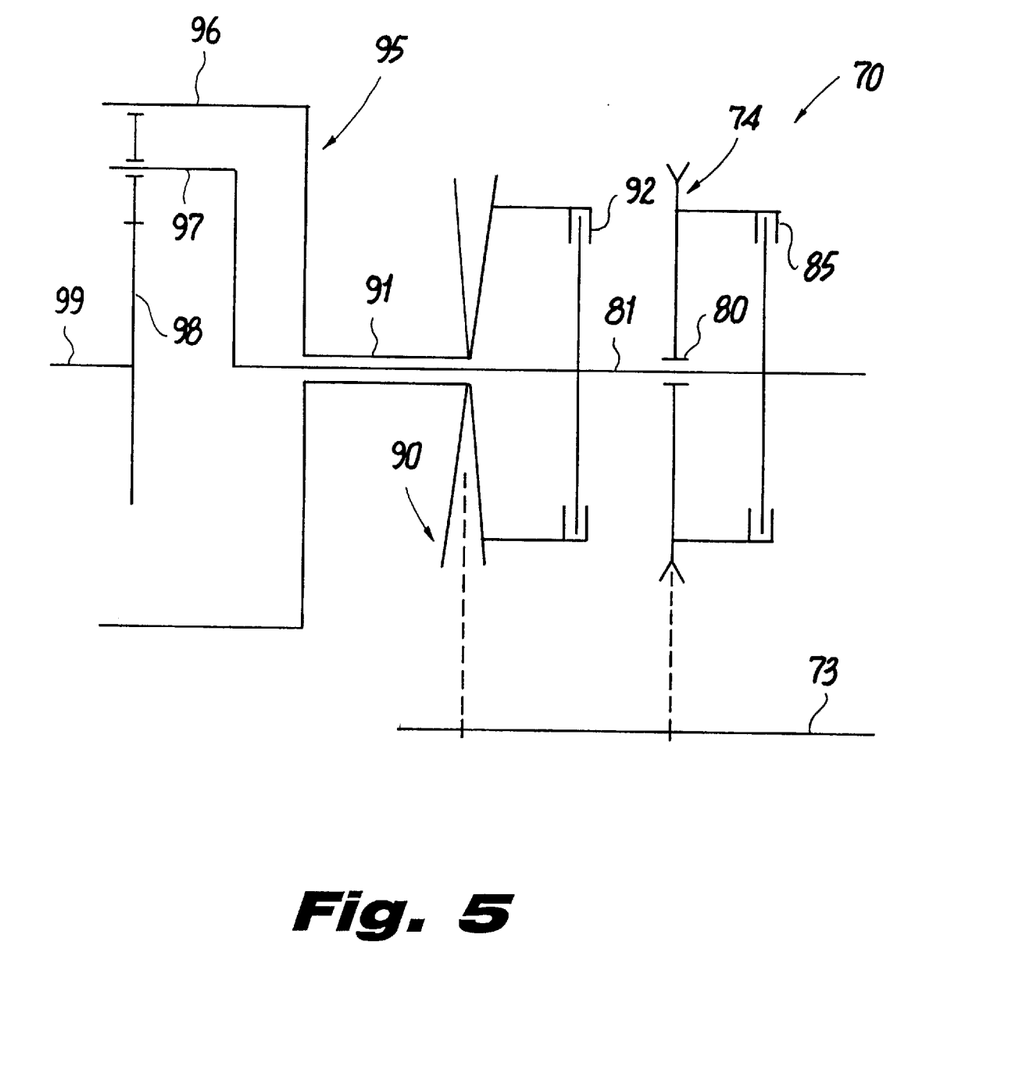
FIG. 5 a further representation, similar to that of FIG. 2, however, for a further embodiment of the invention configured as a planetary ring gear train.
Figure 6:
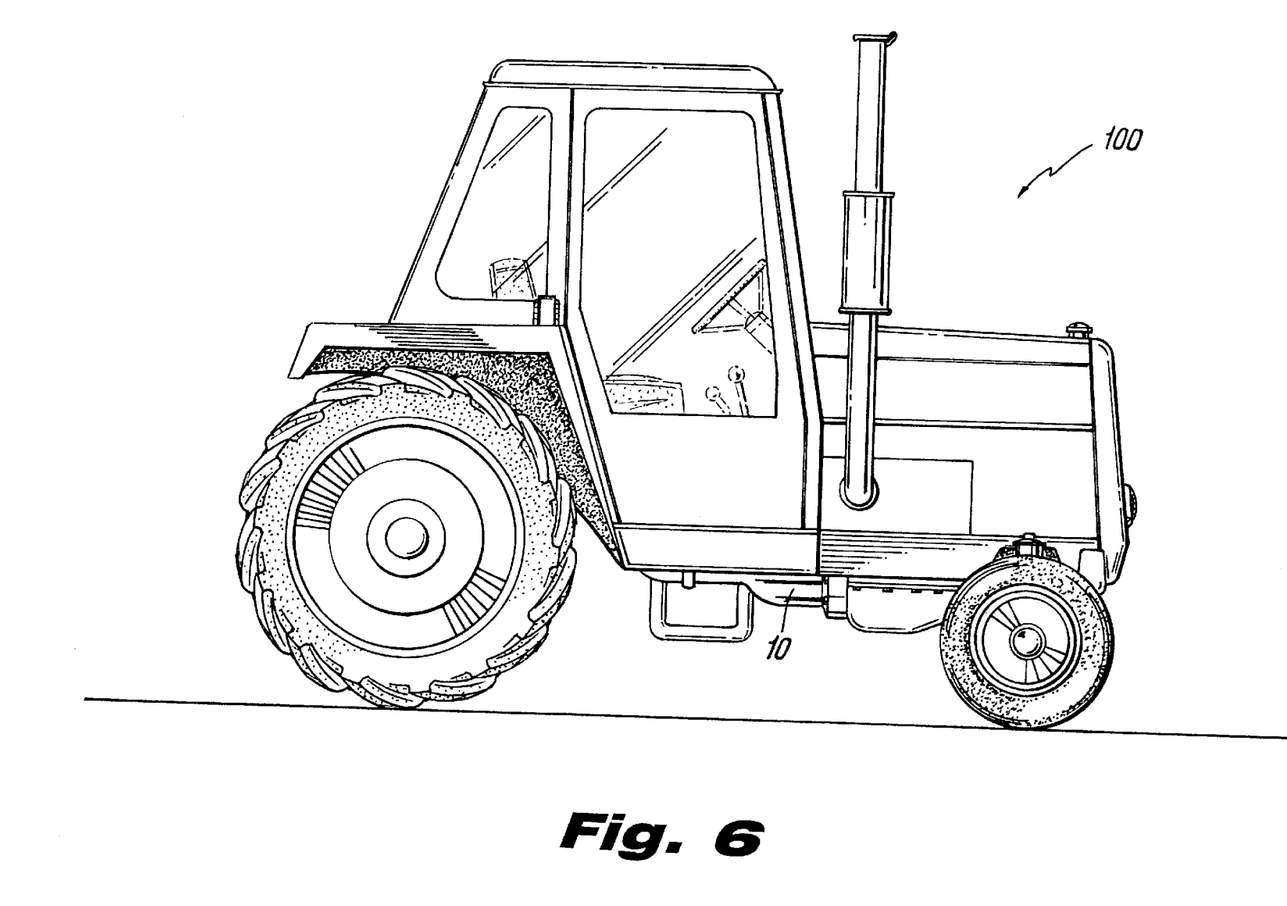
FIG. 6 is a side elevational view of an agricultural vehicle designated generally by reference numeral 100 and including the transmission 1 0 of the subject invention.

Finally, FIG. 5 shows an amended embodiment of a split-power coupled planetary gear box 70 being slightly modified as compared to gear box 10 of FIGS. 1 and 2.

Input power may be transmitted from an input shaft 73 to a belt drive 74 having a constant transmission ratio. Belt drive 74 is journalled by means of a loose bearing 80 on an intermediate shaft 81. By means of a first clutch 45 the loosely journalled pulley of belt drive 74 may be rigidly coupled to intermediate shaft 81 for rotation therewith.

Power may, further, be transmitted from input shaft 73 on a variator 90 having a variable transmission ratio. Variator 90 is rigidly arranged on a hollow shaft 91 for rotation therewith. By means of a second clutch 92 that pulley of variator 90 being arranged on hollows haft 91 may be rigidly connected top intermediate shaft 81 for rotation therewith.

A planetary ring gear train 95 comprises a hollow ring gear 96, an arm 97 and a sun gear 98. An output shaft 99 is rigidly connected to sun gear 98 for rotation therewith. Output shaft 99 extends in extension of intermediate shaft 81 concentrically seating hollow shaft 91. Hollow ring gear 96 is rigidly connected to hollow shaft 91 whereas arm 97 is rigidly connected to intermediate shaft 81.

Gear box 70 of FIG. 5 operates as follows:

In a non-split-power range second clutch 92 is closed. In that case hollow ring gear 96 is rigidly connected to arm 97 via hollow shaft 91, that pulley of variator 90 being attached to hollow shaft 91, second clutch 92 and intermediate shaft 81. Planetary ring gear train 95 then rotates as a rigid block. The input power is then transmitted from input shaft 73 via variator 90 directly to output shaft 99.

In the split-power range, however, only first clutch 85 is closed. Planetary ring gear train 95 now acts as a summing gear stage. A fraction of the input power of gear box 70 being fed to input shaft 73 is then transmitted on arm 97 via belt drive 74, closed first clutch 85 and intermediate shaft 81. A second fraction of the input power is directed onto hollow ring gear 96 via variator 90 and hollow shaft 91. Planetary ring gear train 95 now sums both power fractions up and directs same as a sum to sungear 98 and output shaft 99, respectively.

The further function of gear box 70 corresponds to the function of gear box 10 according to FIGS. 1 and 2 so that also the rotational speed diagrams of FIG. 3 apply accordingly.

If gear box 70 of FIG. 5 is also equipped with a reverse gear stage at its output (cf. FIG. 2), a rotational speed diagram similar to that of FIG. 4 is obtained.

It is claimed:

1. A transmission comprising:
 a) an input shaft;
 b) a variator having an infinitely variable transmission ratio, said variator having a variator input being driven by said input shaft and having a variator output;
 c) a planetary gear train being configured as a summing gear train with a first input, a second input and an output, said first input being adapted to be drivingly connected to said input shaft and said second input being driven by said variator output, wherein said planetary gear train is an epicyclic gear train and includes two gearwheel pairs having each a first and a second gearwheel meshing with each other, said first gearwheels being rigidly mounted on a common arm shaft whereas one of said second gearwheels is connected to said first planetary gear train input for common rotation therewith, and the other of said second gearwheels is connected to said planetary gear train output for common rotation therewith, said arm shaft being rotatably journaled in an arm housing, said arm housing being connected to a hollow shaft constituting said second planetary gear train input;
 d) an output shaft driven by said planetary gear train output;
 e) a first clutch for drivingly connecting said first planetary gear train input to said input shaft; and
 f) a second clutch for drivingly connecting said variator output to said output shaft.

2. The transmission of claim 1, wherein said variator is directly driven by said input shaft.

3. The transmission of claim 1, wherein said first planetary gear train input is driven by said input shaft via fixed transmission ratio means.

4. The transmission of claim 3, wherein said fixed transmission means is configured by a belt drive having fixed pulleys.

5. The transmission of claim 4, wherein one of said fixed pulleys is rigidly arranged on said input shaft.

6. The transmission of claim 3, wherein said fixed transmission ratio means is arranged at a distance from said planetary gear train.

7. The transmission of claim 1, wherein said variator is a belt drive having displaceable pulleys.

8. The transmission of claim 7, wherein one of said displaceable pulleys is rigidly arranged on said input shaft.

9. The transmission of claim 1, wherein said first and said second clutch are adapted to be actuated alternately.

10. The transmission of claim 9, wherein said first and said second clutch are adapted to be actuated alternately upon occurrence of a transition between a first and second output rotational speed range.

11. The transmission of claim 9, wherein said first and said second clutch are adapted to be actuated alternately upon starting.

12. The transmission of claim 9, wherein said first output rotational speed range is a split-power range with only said first clutch being closed for splitting input power on said input shaft into a first fraction being torque-converted in said variator and a second fraction being torque-converted in said planetary gear train, said second output rotational speed range being a non-split-power range with only said second clutch being closed for torque-converting said input power on said input shaft only in said variator.

13. The transmission of claim 12, wherein the transmission ratios in said variator and in said planetary gear train are selected such that output rotational speed of said output shaft is zero when said variator is at a center of its displacement range within said first output rotational speed range.

14. The transmission of claim 13, wherein for starting a unit driven by said transmission the output rotational speed is first set to be zero by means of said variator, the output rotational speed being subsequently increased to a value not equalling zero with said first clutch being closed.

15. The transmission of claim 14, wherein said first and said second clutch are first opened at an output rotational speed not equalling zero, the output rotational speed being subsequently set to zero by means of said variator.

16. The transmission of claim 10, wherein for switching between said output rotational speed ranges said first and said second clutch may be set at their respective inputs and outputs to rotate at same speed for allowing said switching to occur without interruption in transmitted torque.

17. The transmission of claim 16, wherein said first and said second clutch are configured as form-fitting clutches.

18. The transmission of claim 1, wherein said transmission is operated at constant input rotational speed at said input shaft.

19. The transmission of claim 1, wherein output rotational speed of said output shaft may be infinitely adjusted from positive speeds over zero speed to negative speeds depending from a preselected transmission ratio of said transmission.

20. The transmission of claim 1, wherein said variator is arranged at a distance from said planetary gear train.

21. The transmission of claim 1, wherein said output shaft is provided with a reversing gearset.

22. The transmission of claim 21, wherein said reversing gearset comprises:
   a) a first gearset with an even number of gearwheels for propulsion in a reversed direction;
   b) a second gearset with an odd number of gearwheels for propulsion in a forward direction;
   c) a clutch for alternately switching said first or said second gearset into flow of torque from said output shaft.

23. An agricultural vehicle having a transmission comprising:
   a) an input shaft;
   b) a variator having an infinitely variable transmission ratio, said variator having a variator input being driven by said input shaft and having a variator output;
   c) a planetary gear train being configured as a summing gear train with a first input, a second input and an output, said first input being adapted to be drivingly connected to said input shaft and said second input being driven by said variator output wherein said planetary gear train is an epicyclic gear train and includes two gearwheel pairs having each a first and a second gearwheel meshing with each other, said first gearwheels being rigidly mounted on a common arm shaft whereas one of said second gearwheels is connected to said first planetary gear train input for common rotation therewith, and the other of said second gearwheels is connected to said planetary gear train output for common rotation therewith, said arm shaft being rotatably journaled in an arm housing, said arm housing being connected to a hollow shaft constituting said second planetary gear train input;
   d) an output shaft driven by said planetary gear train output;
   e) a first clutch for drivingly connecting said first planetary gear train input to said input shaft; and
   f) a second clutch for drivingly connecting said variator output to said output shaft.

24. An agricultural machine having a transmission comprising:
   a) an input shaft;
   b) a variator having an infinitely variable transmission ratio, said variator having a variator input being driven by said input shaft and having a variator output;
   c) a planetary gear train being configured as a summing gear train with a first input, a second input and an output, said first input being adapted to be drivingly connected to said input shaft and said second input being driven by said variator output wherein said planetary gear train is an epicyclic gear train and includes two gearwheel pairs having each a first and a second gearwheel meshing with each other, said first gearwheels being rigidly mounted on a common arm shaft whereas one of said second gearwheels is connected to said first planetary gear train input for common rotation therewith, and the other of said second gearwheels is connected to said planetary gear train output for common rotation therewith, said arm shaft being rotatably journaled in an arm housing, said arm housing being connected to a hollow shaft constituting said second planetary gear train input;
   d) an output shaft driven by said planetary gear train output;
   e) a first clutch for drivingly connecting said first planetary gear train input to said input shaft; and
   f) a second clutch for drivingly connecting said variator output to said output shaft.

25. An agricultural vehicle having a transmission comprising:
   a) an input shaft;
   b) a variator having an infinitely variable transmission ratio, said variator having a variator input being driven by said input shaft and having a variator output;
   c) a planetary gear train being configured as a summing gear train with a first input, a second input and an output, said first input being adapted to be drivingly connected to said input shaft and said second input being driven by said variator output, wherein said planetary gear train is a planetary ring gear train and has an arm constituting said first planetary gear train input, has a ring gear constituting said second planetary gear train input, and has a sun gear constituting said planetary gear train output;
   d) an output shaft driven by said planetary gear train output;
   e) a first clutch for drivingly connecting said first planetary gear train input to said input shaft; and
   f) a second clutch for drivingly connecting said variator output to said output shaft.

26. An agricultural machine having a transmission comprising:
   a) an input shaft;
   b) a variator having an infinitely variable transmission ratio, said variator having a variator input being driven by said input shaft and having a variator output;
   c) a planetary gear train being configured as a summing gear train with a first input, a second input and an output, said first input being adapted to be drivingly connected to said input shaft and said second input being driven by said variator output, wherein said planetary gear train is a planetary ring gear train and has an arm constituting said first planetary gear train input, has a ring gear constituting said second planetary gear train input, and has a sun gear constituting said planetary gear train output;

d) an output shaft driven by said planetary gear train output;

e) a first clutch for drivingly connecting said first planetary gear train input to said input shaft; and f) a second clutch for drivingly connecting said variator output to said output shaft.

27. A transmission comprising:

a) an input shaft;

b) a variator having an infinitely variable transmission ratio, said variator having a variator input being driven by said input shaft and having a variator output;

c) a planetary gear train being configured as a summing gear train with a first input, a second input and an output, said first input being adapted to be drivingly connected to said input shaft and said second input being driven by said variator output, wherein said planetary gear train is a planetary ring gear train and has an arm constituting said first planetary gear train input, has a ring gear constituting said second planetary gear train input, and has a sun gear constituting said planetary gear train output;

d) an output shaft driven by said planetary gear train output;

e) a first clutch for drivingly connecting said first planetary gear train input to said input shaft; and f) a second clutch for drivingly connecting said variator output to said output shaft.

28. The transmission of claim 27, wherein said first and said second clutch are adapted to be actuated alternately upon occurrence of a transition between a first and a second output rotational speed range.

29. The transmission of claim 28, wherein said first output rotational speed range is a split-power range with only said first clutch being closed for splitting input power on said input shaft into a first fraction being torque-converted in said variator and a second fraction being torque-converted in said planetary gear train, said second output rotational speed range being a non-split-power range with only said second clutch being closed for torque-converting said input power on said input shaft only in said variator.

30. The transmission of claim 29, wherein the transmission ratios in said variator and in said planetary gear train are selected such that output rotational speed of said output shaft is zero when said variator is at a center of its displacement range within said first output rotational speed range.

31. The transmission of claim 30, wherein for starting a unit driven by said transmission the output rotational speed is first set to be zero by means of said variator, the output rotational speed being subsequently increased to a value not equaling zero with said first clutch being closed.

32. The transmission of claim 31, wherein said first and said second clutch are first opened at an output rotational speed not equaling zero, the output rotational speed being subsequently set to zero by means of said variator.

33. The transmission of claim 28, wherein for switching between said output rotational speed ranges said first and said second clutch may be set at their respective inputs and outputs to rotate at same speed for allowing said switching to occur without interruption in transmitted torque.

34. The transmission of claim 33, wherein said first and said second clutch are configured as form-fitting clutches.

35. The transmission of claim 27, wherein output rotational speed of said output shaft may be infinitely adjusted from positive speeds over zero speed to negative speeds depending from a preselected transmission ratio of said transmission.

36. The transmission of claim 27, wherein said output shaft is provided with a reversing gearset.

37. The transmission of claim 36, wherein said reversing gearset includes:

a) a first gearset with an even number of gearwheels for propulsion in a reversed direction;

b) a second gearset with an odd number of gearwheels for propulsion in a forward direction;

c) a clutch for alternately switching said first or said second gearset into flow of torque from said output shaft.

* * * * *